US011567935B2

(12) United States Patent
Liang et al.

(10) Patent No.: US 11,567,935 B2
(45) Date of Patent: Jan. 31, 2023

(54) CONDITIONAL RESPONSE FULFILLMENT CACHE FOR LOCALLY RESPONDING TO AUTOMATED ASSISTANT INPUTS

(71) Applicant: Google LLC, Mountain View, CA (US)

(72) Inventors: Benedict Liang, New York, NY (US); Bryan Christopher Horling, Belmont, MA (US); Lan Huo, New York, NY (US); Anarghya Mitra, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 17/217,671

(22) Filed: Mar. 30, 2021

(65) Prior Publication Data

US 2022/0318248 A1     Oct. 6, 2022

(51) Int. Cl.
| G06F 16/2453 | (2019.01) |
| G06F 16/242 | (2019.01) |
| G06F 16/2455 | (2019.01) |
| G06F 16/248 | (2019.01) |
| G10L 15/22 | (2006.01) |
| G10L 15/30 | (2013.01) |

(52) U.S. Cl.
CPC ...... *G06F 16/24539* (2019.01); *G06F 16/243* (2019.01); *G06F 16/248* (2019.01); *G06F 16/24552* (2019.01); *G10L 15/22* (2013.01); *G10L 15/30* (2013.01); *G10L 2015/221* (2013.01)

(58) Field of Classification Search
None
See application file for complete search history.

(56) References Cited

U.S. PATENT DOCUMENTS 8,688,894 B2 * 4/2014 Kuehne ............... G06F 12/0246
                                                      711/207
9,990,176 B1    6/2018 Gray
                        (Continued)

FOREIGN PATENT DOCUMENTS

WO     2020218929      10/2020

OTHER PUBLICATIONS

European Patent Office; International Search Report and Written Opinion of Application No. PCT/US2021/063625; 12 pages; dated Apr. 5, 2022.

*Primary Examiner* — Kim T Nguyen
(74) *Attorney, Agent, or Firm* — Gray Ice Higdon

(57) ABSTRACT

Implementations set forth herein relate to conditionally caching responses to automated assistant queries according to certain contextual data that may be associated with each automated assistant query. Each query can be identified based on historical interactions between a user and an automated assistant, and—depending on the query, fulfillment data can be cached according to certain contextual data that influences the query response. Depending on how the contextual data changes, a cached response stored at a client device can be discarded and/or replaced with an updated cached response. For example, a query that users commonly ask prior to leaving for work can have a corresponding assistant response that depends on features of an environment of the users. This unique assistant response can be cached, before the users provide the query, to minimize latency that can occur when network or processing bandwidth is unpredictable.

20 Claims, 6 Drawing Sheets

(56) References Cited

U.S. PATENT DOCUMENTS

| | | | |
|---|---|---|---|
| 10,628,052 B2* | 4/2020 | Kaburaki | G06F 3/0611 |
| 10,992,768 B1* | 4/2021 | Bhatnagar | H04L 67/568 |
| 11,102,165 B2* | 8/2021 | Deshpande | H04L 61/4511 |
| 11,176,928 B2* | 11/2021 | Schairer | G10L 15/22 |
| 11,477,160 B2* | 10/2022 | Deshpande | H04L 61/5007 |
| 2011/0055458 A1* | 3/2011 | Kuehne | G06F 12/0246 |
| | | | 711/E12.001 |
| 2019/0235762 A1* | 8/2019 | Kaburaki | G06F 12/0864 |
| 2019/0311710 A1 | 10/2019 | Eraslan et al. | |
| 2020/0213265 A1* | 7/2020 | Deshpande | H04L 61/58 |
| 2021/0074286 A1 | 3/2021 | Cotting et al. | |
| 2021/0218698 A1* | 7/2021 | Murillo | H04L 51/48 |
| 2021/0248998 A1* | 8/2021 | Schairer | G10L 15/30 |
| 2021/0336921 A1* | 10/2021 | Deshpande | H04L 61/5007 |
| 2022/0318248 A1* | 10/2022 | Liang | G06F 16/243 |

* cited by examiner

CONDITIONAL RESPONSE FULFILLMENT CACHE FOR LOCALLY RESPONDING TO AUTOMATED ASSISTANT INPUTS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, a user can interact with an automated assistant through any assistant device of an ecosystem of assistant devices. An ecosystem of assistant devices can refer to one or more devices that each include a local assistant client application and/or that are each associated with a corresponding assistant account that is controlled by one or more users. This ecosystem of assistant devices can include portable assistant device(s) that the user carries with them as they travel, home assistant device(s) that remain in different rooms of their home or other structure, and/or in-vehicle device(s).

In order for the automated assistant to provide accurate and relevant responses to various user queries, a client device can retrieve data from a server that manages the data that is accessible to the automated assistant. In some instances, in response to a user query, a client automated assistant can request data from the server, but a response from the server can be delayed as a result of network and/or processing constraints. As a result, an interaction between a user and an automated assistant can be prone to delays and/or otherwise inconsequential. When such interactions occur for a population of users, computational resources for the corresponding pool of client devices can be wasted. For example, when a population of users in a city frequently ask, around the same time of day, about a local news event (e.g., construction-related traffic), a server network associated with the city can exhibit a decrease in available bandwidth. Various client devices relying on the server network can exhibit latency and other operational deficiencies as a result.

SUMMARY

Implementations set forth herein relate to maintaining an assistant response cache at various assistant-enabled devices. An automated assistant can access the assistant response cache when fulfilling an assistant request (e.g., a spoken utterance from a user) when certain criteria associated with the assistant response cache are satisfied. For example, an assistant response cache can be maintained and/or updated according to how a context of one or more users, devices, and/or automated assistants change over time. In some instances, an intent associated with providing a weather report can be maintained in the assistant response cache, and the assistant response cache can be updated with weather data as certain features of a context of the user change over time. In this way, when a weather report intent is initialized by a user, the assistant response cache will have accurate data stored therein for fulfilling the weather report intent. These techniques for managing an assistant response cache can reduce response latency exhibited by the automated assistant and can also preserve processing bandwidth that can be consumed when response fulfillment operations are limited to a post-request time frame.

In some implementations, the assistant response cache can include one or more textual queries and/or intents associated with a particular user. Response fulfillment data corresponding to those queries and/or intents can be dynamically updated as features of a context of the user change. For example, a query such as, "Navigate home," can be stored in association with an intent "navigate{ location: $location; destination: $home}." The assistant response cache can include client response fulfillment data that is dynamically updated as values for the parameters (e.g., "$location") of the intent change. For instance, the assistant response cache can include textual data, audio data, navigation data, and/or other data that can be used by the automated assistant when responding to a request to provide navigation instructions. Prior to providing such a request, the response fulfillment data can be retrieved via a server request, or via pushed server data, that identifies a value for the parameter "$location" as a current location of the user and a value for the parameter "$home" as a pre-configured home address of the user. In some implementations, this server data can be provided by the assistant server when a location of the user changes, thereby ensuring that the assistant response cache will have accurate data when or if the user subsequently provides a request for directions home.

In some implementations, the assistant response cache can include response fulfillment data that is allocated or grouped according to certain conditions that influence when a respective portion of response fulfillment data is considered invalid or otherwise expired. For example, a client device that is hosting data in an assistant response cache can determine, based on a current context of the client device, whether the data in the assistant response cache is currently stale or otherwise irrelevant. In some instances, the client device and/or automated assistant can determine that a cached intent referring to a date and/or time parameter value (e.g., $datetime) has expired because the current time is now a threshold duration of time greater than the date and/or time value stored with the cached intent. Based on this determination, the client device and/or automated assistant can provide a request to a corresponding assistant server in order to retrieve response fulfillment data that has not expired or is otherwise still relevant.

As an example, the automated assistant can manage an assistant response cache that includes an intent and/or query associated with providing a user with a list of items that are on a calendar for an upcoming weekend. The intent can be structured as, "scheduleAssistant{$startDateTime; $endDateTime)," wherein the parameter values $startDateTime and $endDateTime correspond to values for a date at the beginning of an upcoming weekend and another date for the end of the upcoming weekend. Response fulfillment data can be requested from an assistant server in order that the assistant response cache can incorporate data for satisfying the intent—should the user provide a request that employs the intent (e.g., "Assistant, what's on my calendar this weekend?"). This intent can be stored in the assistant response cache in association with one or more conditions for determining whether the response fulfillment data is still current or up to date. For example, a condition can be whether calendar data for the upcoming weekend has been modified since the user previously invoked the automated assistant to determine what is on the calendar for the upcoming weekend. Therefore, when the automated assistant determines that the calendar data has been modified subsequent to the user requesting the calendar data from the automated assistant, the automated assistant can consider the response fulfillment data to not be current. Based on this determination, the assistant response cache can be updated via a request to the assistant server, or pushed data from the assistant server, in order to access current calendar data that can be used when or if the user subsequently requests calendar data from the automated assistant.

In some implementations, other conditions can be provided for managing the assistant response cache, in order that multiple users and/or devices can benefit from assistant response caches at each respective device. For example, various intents and/or queries can be stored in association with a user identifier, device identifier, conversation identifier, and/or any other data that can limit how certain response fulfillment data is maintained and/or employed. In accordance with the aforementioned example, response fulfillment data corresponding to the weekend calendar data can be stored in association with a user identifier. In this way, the conditions associated with the response fulfillment data, such as whether a user has already requested weekend calendar data from the automated assistant, can be limited to a particular user. In this way, the management of the assistant response cache can be adapted according to how individual users interact with the automated assistant. For instance, a first user may rely on an assistant response cache that maintains the calendar intent(s), and a second user may rely on the assistant response cache that maintains the navigation intent(s). This can preserve computational resources such as memory and network bandwidth—at least compared to caching response fulfillment data that is agnostic relative to individual conditions and/or historical user interactions.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
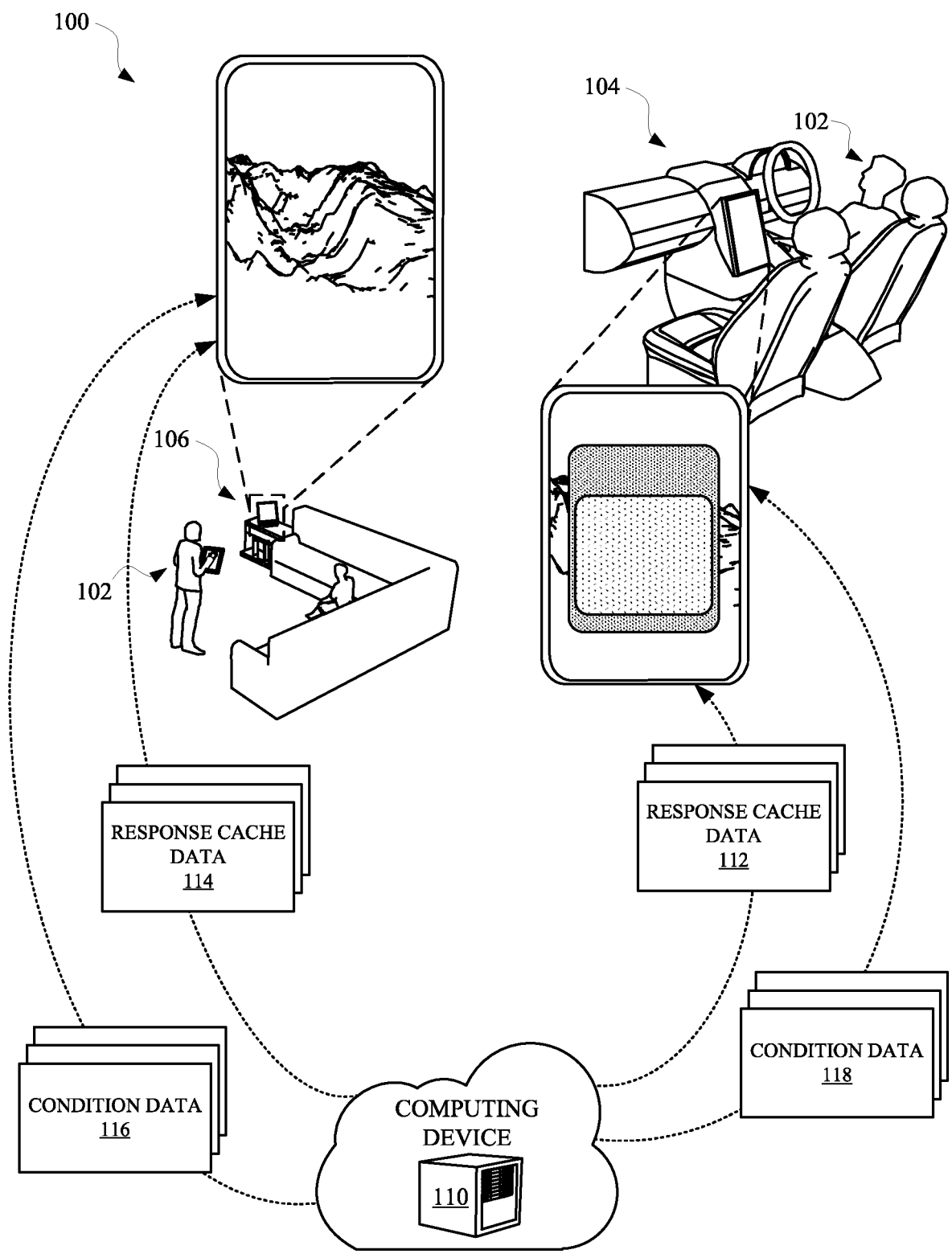
FIG. 1A, FIG. 1B, and FIG. 1C illustrate views of an assistant response cache being utilized in order to fulfill an assistant input when one or more conditions associated with the assistant response cache are satisfied.
Figure 1B:
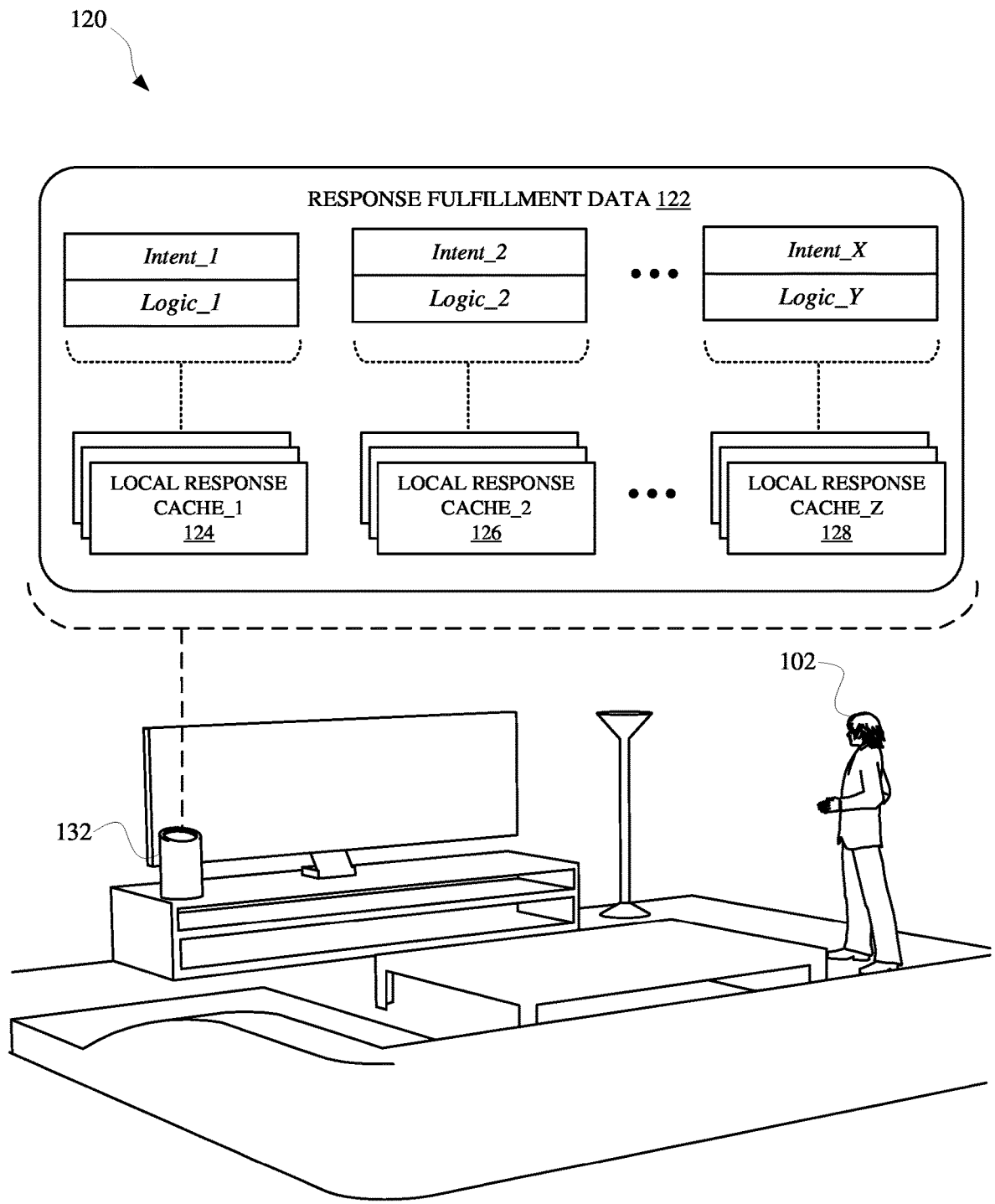
Figure 1C:
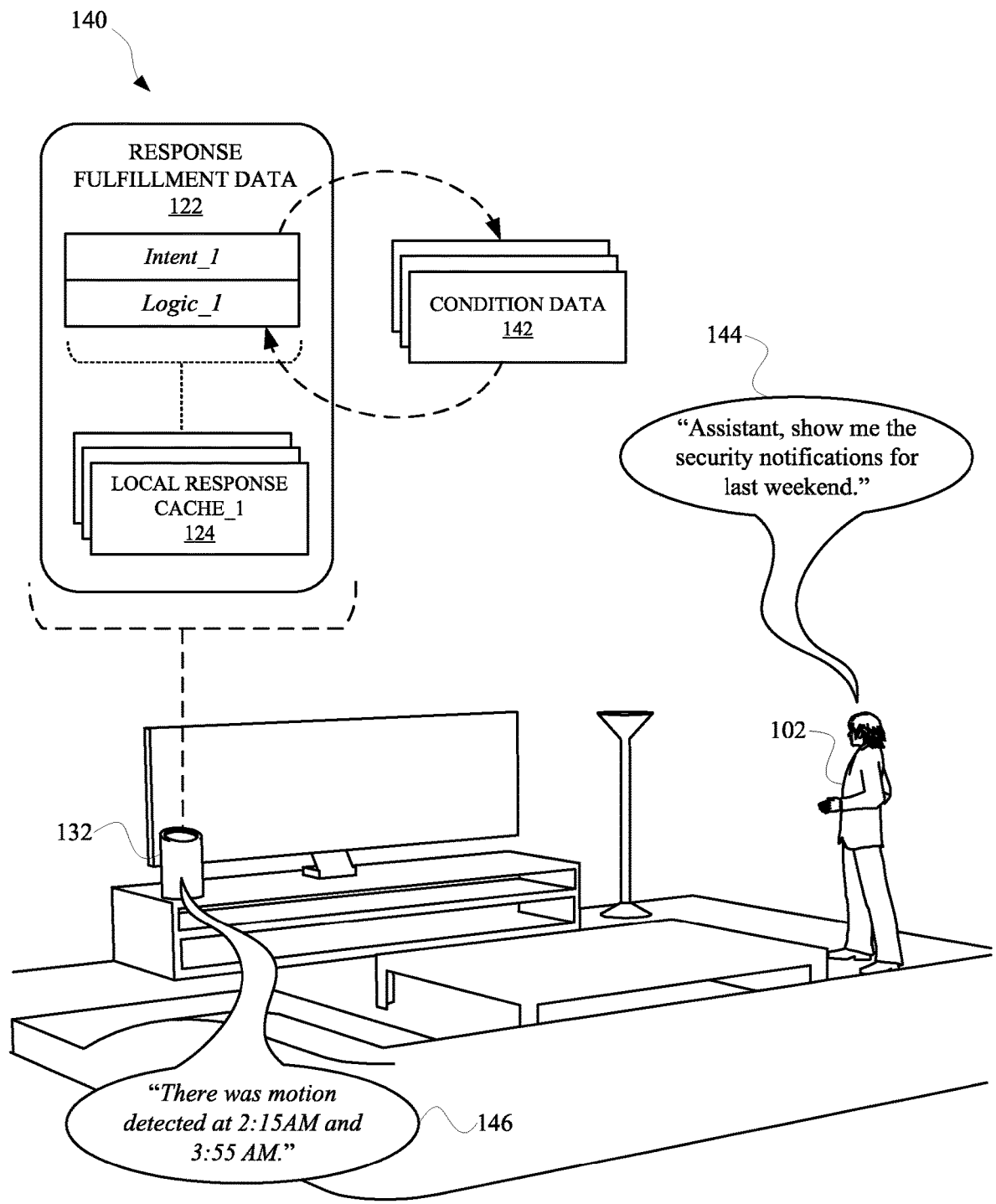

FIG. 1A, FIG. 1B, and FIG. 1C illustrate a view 100, a view 120, and a view 140 of an assistant response cache being utilized in order to fulfill an assistant input when one or more conditions associated with the assistant response cache are satisfied. An assistant response cache can be stored at each client computing device of an ecosystem of client computing devices that provide access to an automated assistant. In this way, response latency can be minimized while also preserving computational resources, such as network bandwidth, that can otherwise be consumed when an automated assistant is frequently requesting server data in response to assistant inputs. For example, a computing device 110 (e.g., a server) can provide response cache data 114 and different response cache data 112 to various client computing devices of an ecosystem of client devices associated with a user 102. Alternatively, or additionally, the computing device 110 can provide condition data 116 and different condition data 118 to client computing devices, respectively, in order for the client computing devices to determine whether their respective response cache data is still valid.

In some implementations, an ecosystem of assistant devices can include a home display device 106 and a vehicle 104, which can each provide access to an automated assistant. Each of the vehicle 104 and the home display device 106 can be a computing device that includes at least a display panel, microphone, and/or one or more other interfaces for interacting with an automated assistant. The response cache data 114 and response cache data 116 can, with prior permission from the user 102, be generated at the computing device 110 based on historical interaction data that characterizes one or more interactions between the user 102 and the automated assistant, the user 102 and a third party application, and/or the automated assistant and a third party application.

In some implementations, response cache data can include an identifier for each cache entry included in the response cache data (i.e., response fulfillment data). Alternatively, or additionally, response cache data can include identifiers for a user, an operation intent, a device, a modality, and/or any other information that can be associated with an assistant cache entry. The condition data 116 can characterize conditions and/or logic that can be used by a respective client computing device for determining whether corresponding response cache data has expired or is otherwise invalid. In some implementations, a condition for determining validity of response fulfillment data can be determined by one or more client devices and/or one or more server devices. Alternatively, or additionally, one or more conditions for a cache entry of response fulfillment data can include one or more temporal conditions and/or one or more non-temporal conditions. For example, a non-temporal condition can include, but is not limited to, a location of a user being within a threshold distance of a particular location. In this way, when the user is located within the threshold distance of the particular location, response fulfillment data associated with this condition can be considered valid.

Alternatively, or additionally, a non-temporal condition can include, but is not limited to, a status of an operation of the automated assistant and/or a third party application associated with the user 102. For example, user interaction data can indicate that the user 102 has previously invoked the automated assistant multiple times in order to determine whether a third party security application has detected motion within a vicinity of a home of the user 102. The user 102 can request this information from the automated assistant, which can communicate with the third party security application via an application programming interface (API) or other application interface. The user interaction data can further indicate that the user typically requests this information every Monday morning when the user is at home, and the request can correspond to a period of motion detection occurring during the most recent, previous weekend. In some implementations, the user interaction data can be processed using one or more trained machine learning models and/or one or more heuristic processes in order to generate condition data 116 and/or condition data 118. The condition data can then indicate when the response cache data (e.g., recent motion activity notifications) is expired, at least for purposes of continuing to update the response cache data in preparation for responding to an assistant input from the user 102.

When one or more client devices of an ecosystem of client devices have available response fulfillment data, the user 102 can provide an assistant input that is fulfilled locally at a client device—without the automated assistant submitting a server request. For example, the user 102 can interact with a client device 132 in order to access the automated assistant and retrieve information from a third party security application. The client device 132 can store response fulfillment data 122 that includes one or more different cache entries, and each cache entry can be associated with an operation intent, intent data, and condition logic. For example, and as provided in view 120 of FIG. 1B, the response fulfillment data 122 can include a local response cache_1 124 corresponding to an intent_1 (e.g., one or more operation intents) and logic_1 (e.g., one or more conditions), a local response cache_2 126 corresponding to an intent_2 and logic_2, and a local response cache_Z 128 corresponding to an intent_X and logic_Y (wherein X, Y, and Z are placeholder values indicating a total number of each respective feature of the response fulfillment data 122).

When the user 102 provides a spoken utterance 144 or other assistant input, as provided in view 140 of FIG. 1C, the client device 132 can process audio data capturing the spoken utterance 144 in order to identify features of the spoken utterance 144. For example, based on processing the spoken utterance 144 (e.g., "Assistant, show me the security notifications for last weekend."), the automated assistant can determine that the spoken utterance 144 refers to an operation intent of rendering security data from a third party security application. Alternatively, or additionally, the automated assistant can determine that the user 102 is associated with a stored account that has access to a third party security application. In some implementations, features of the spoken utterance 144 can be compared to condition data 142 associated with response fulfillment data 122 in order to determine whether a response cache can be used for responding to the spoken utterance 144.

For example, a user identifier can be identified based on voice characteristics embodied in the spoken utterance 144, and the condition data 142 can indicate that the user identifier is also a condition of the local response cache_1 124. Alternatively, or additionally, an operation intent can be identified based on speech-to-text processing of the spoken utterance 144 and/or natural language understanding (NLU) of the spoken utterance 144. The automated assistant can determine that the operation intent satisfies a condition that a particular operation intent should be identified in order to use the local response cachei 124 for responding to an assistant input. When each condition characterized by the condition data 142 for the local response cache_1 124 is satisfied, the automated assistant can determine that the data stored with the local response cache_1 124 is valid or otherwise not expired. Therefore, the automated assistant can utilize the local response cache_1 124 in order to provide a response 146 to the spoken utterance 144 (e.g., "There was motion detected at 2:15 AM and 3:55 AM.").

Figure 2:
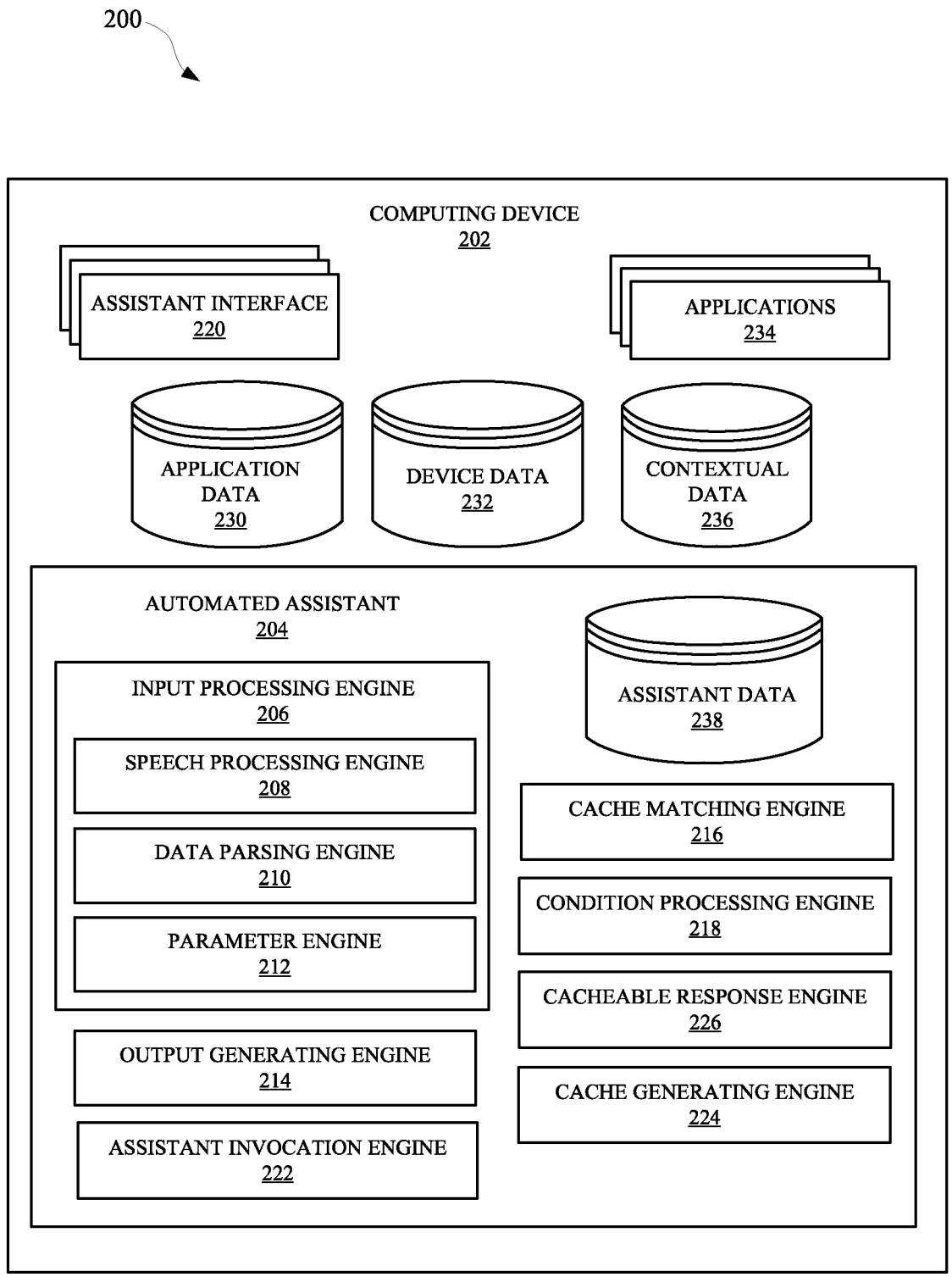
FIG. 2 illustrates a system for conditionally caching responses to automated assistant queries according to certain interaction data that may be associated with each automated assistant query.

FIG. 2 illustrates a system 200 for conditionally caching responses to automated assistant queries according to certain interaction data that may be associated with each automated assistant query. The automated assistant 204 can operate as part of an assistant application that is provided at one or more computing devices, such as a computing device 202 and/or a server device. A user can interact with the automated assistant 204 via an assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204.

The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors. Alternatively, or additionally, the computing device 202 can be a wearable device that can be worn as a clothing accessory of a user and/or a health monitor for the user.

The computing device 202 and/or other third party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)— or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as an operation status of one or more applications of the one or more applications 234 and/or a state of a respective device that is associated with the computing device 202. A device state engine of the automated assistant 204 and/or the computing device 202 can access device data 232 to determine one or more actions (i.e., operations) that are being, or capable of being, performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states.

The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, system 200 can include a cache matching engine 216 that can determine whether an assistant input from a user corresponds to one or more cache entries that are available to the automated assistant 204. Each cache entry can include response fulfillment data and/or condition data, which can be used when responding to certain assistant inputs from a user. In some implementations, the cache matching engine 216 can identify an identifier for a user that provided an assistant input and determine whether one or more cache entries in the assistant data 238 are associated with the user. In this way, the cache matching engine 216 can filter out cache entries in order to identify a suitable cache entry for fulfilling the assistant input. Alternatively, or additionally, the cache matching engine 216 can identify one or more operation intents to be performed in order to fulfill the assistant input (e.g., identify an assistant operation requested by the user). The cache matching engine 216 can use the identified one or more operation intents in order to determine whether one or more cache entries include data suitable for fulfilling the operation intents. In some implementations, the one or more operation intents are compared to a subset of cache entries that have been filtered according to a user identifier, non-temporal data, temporal data, location of a user and/or a device, and/or any other property that can be used for filtering entries. When a cache entry is identified for responding to an assistant input, the output generating engine 214 can use data associated with the identified cache entry in order to render a response for the user.

The system 200 can further include a condition processing engine 218, which can process application data 230, device data 232, and/or contextual data 236 in order to determine whether one or more conditions associated with a respective entry are satisfied. When one or more conditions associated with a cache entry are determined to be satisfied, or not satisfied, the response fulfillment data corresponding to that cache entry can be considered invalid or otherwise expired. As a result, the automated assistant 204 can request updated response fulfillment data from an assistant server in order to retrieve response fulfillment data that would not be considered expired. Alternatively, or additionally, the automated assistant 204 can request updated condition data from the assistant server in order to determine whether any updated condition(s) for the cache entry is available, and then re-evaluate whether the current response fulfillment data is valid. In some implementations, the condition processing engine 218 can indicate to the automated assistant 204 whether certain cache entries should be removed from a memory cache of the computing device 202. In this way, memory of the computing device 202 can be re-used, and new cache entries can replace invalid entries.

In some implementations, the system 200 can include a cacheable response engine 226 that can determine whether an assistant input, and/or response fulfillment data associated with an assistant input, can be used to generate a cache entry for storage at the computing device 202. The cacheable response engine 226 can determine whether a cache entry should be generated for an assistant input based on a variety of different features of the assistant input and/or historical interaction data. For example, the cacheable response engine 226 can determine that a user has periodically invoked the automated assistant 204 to execute a particular operation intent under certain conditions. Based on this determination, the cacheable response engine 226 can identify one or more conditions that should be satisfied for certain response fulfillment data to be valid for performing the particular operation intent. Alternatively, or additionally, the cacheable response engine 226 can retrieve response fulfillment data associated with the particular operation intent when the one or more conditions are satisfied and/or prior to an instance in which the user is expected, by the automated assistant 204, to invoke the automated assistant 204 to execute the particular operation intent.

In some implementations, the system 200 can include a cache entry engine 224 that can process data associated with each cache entry in order to determine whether one or more conditions associated with a respective cache entry are satisfied. When the cache entry engine 224 determines that a particular cache entry includes invalid data or otherwise expired data, the cache entry engine 224 can generate a request to be provided to a separate server device. The request can be provided to the separate server device in order to indicate to the server device that the cache entry includes data that is expired. In some implementations, the server device can push data to each client computing device without each client computing device having to request new cache entry data. Alternatively, or additionally, the cache generating engine 224 can receive pushed data from the server device and generate a cache entry for the pushed data and/or store the pushed data in association with an existing cache entry.

In some implementations, the server device can receive a request from a client device in order to receive response fulfillment data for storing with a cache entry for subsequent use when locally executing an intent. The server device can determine whether the response fulfillment data is suitable for caching at a client computing device based on a variety of different data associated with the intent. For example, the server device can determine whether the response fulfillment data is expected to be modified (e.g., by a user and/or an application) within a threshold duration of time from receiving the request from the client device. When the response fulfillment data is not expected to be modified (e.g., based on historical interaction data) within the threshold duration of time, the server device can provide the response fulfillment data to the client device for storing in association with a cache entry. Alternatively, or additionally, the server device can determine whether the response fulfillment data is expected to be accessed within another threshold duration of time from receiving the request from the client device. When the response fulfillment data is expected to be accessed (e.g., based on historical interaction data) with the threshold duration of time, the server device can provide the response fulfillment data to the client device for storing with a cache entry. In this way, the server device and client device can utilize the response fulfillment data in a way that does not arbitrarily consume memory and network bandwidth.

Figure 3:
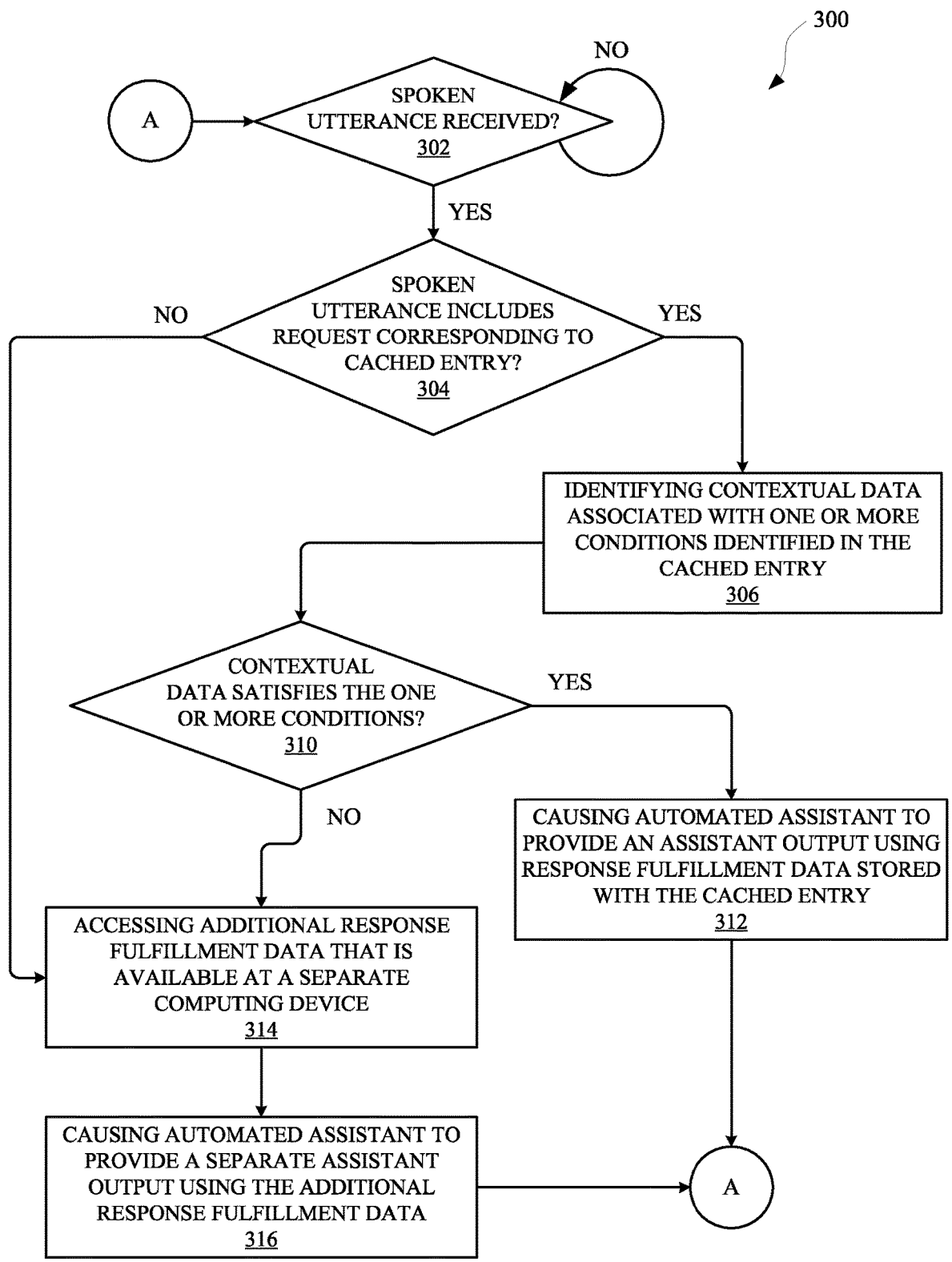
FIG. 3 illustrates a method for utilizing response fulfillment data when an assistant input from a user matches a cache entry that has been provided to one or more assistant devices prior to the user providing the assistant input.

FIG. 3 illustrates a method 300 for utilizing response fulfillment data when an assistant input from a user matches a cache entry that has been provided to one or more assistant devices prior to the user providing the assistant input. The method 300 can be performed by one or more applications, devices, and/or any other apparatus or module capable of interacting with an automated assistant. The method 300 can include an operation 302 of determining whether a user has provided a spoken utterance or other assistant input to an automated assistant that is available at a client computing device. The spoken utterance can be, for example, a request for the automated assistant to provide information that the user may frequently inquire about (e.g., "Assistant, how much precipitation will there be tonight?"). In order to reduce latency when responding to such inputs, the automated assistant can access an assistant response cache that is stored in a memory of one or more client computing devices. In some implementations, cache entries stored in each assistant response cache can be provided by an assistant server(s) associated with the automated assistant, an operating system of each client device, a third party application with prior permission from the user, and/or an automated assistant application.

The method 300 can further include an operation 304 of determining whether the spoken utterance or other assistant input includes a request corresponding to a cache entry in the assistant response cache. The operation 304 can be performed by determining whether one or more operation intents corresponding to a request(s) embodied in the spoken utterance are also identified in one or more cached entries of the assistant response cache. Alternatively, or additionally, the operation 304 can be performed by determining whether natural language content of the spoken utterance corresponds to natural language content stored in association with one or more operation intents of the assistant response cache. For example, the assistant response cache can include command text that is stored in association with one or more operation intents. The command text can include natural language content that characterizes one or more different assistant commands that, when provided by the user to an automated assistant, cause the automated assistant to execute the one or more operation intents. In this way, a spoken utterance or other assistant input can be correlated to a cache entry in a variety of different ways.

When the spoken utterance or other assistant input is determined to include one or more requests corresponding to a cache entry, the method 300 can proceed to an operation 306 of identifying contextual data associated with one or more conditions identified in the cache entry, or otherwise associated with the cache entry. Otherwise, the method 300 can proceed from the operation 304 to an operation 314. Identifying the contextual data can be performed in order to determine whether response fulfillment data stored at the cache entry is valid for fulfilling the request(s) from the user. In some implementations, the one or more conditions can include one or more non-temporal conditions. For example, in some implementations, the one or more conditions can depend on whether a third party application (e.g., third party relative to an entity that provides the automated assistant) is exhibiting a particular operating status. Alternatively, or additionally, the one or more conditions can depend on a location of the user (with prior permission from the user), a location of a client computing device, an operating status of a computing device, historical interaction data that is based on interactions between the automated assistant and the user, user preference data generated based on one or more user preferences, and/or any other data that can be associated with a user and/or an automated assistant.

The method 300 can proceed from operation 306 to an operation 310, which can include determining whether the contextual data satisfies the one or more conditions associated with the identified cache entry. For example, when the one or more conditions include a condition that the user is within a threshold distance of a particular location with a threshold time period, the one or more conditions can be satisfied when the contextual data indicates that the user is within the threshold distance of the particular location. Alternatively, or additionally, when the one or more conditions include an operating status of a third party application, the one or more conditions can be satisfied when the contextual data indicates that the third party application is exhibiting the operating status. When the one or more conditions are determined to be satisfied, the method 300 can proceed from operation 310 to an operation 312. Otherwise, the method 300 can proceed from operation 310 to an operation 316.

The operation 312 can include causing the automated assistant to provide an assistant output using response fulfillment data stored with the cache entry. For example, when the cache entry identifies an operation intent, such as providing precipitation data for a period of time, the automated assistant can render a natural language output (e.g., "There will be 22% precipitation tomorrow and 18% precipitation Saturday.") that is based on the operation intent and fulfills the request from the user. Thereafter, the method 300 can proceed from operation 312 to the operation 302 via continuation element "A," as illustrated in FIG. 3. Otherwise, when the contextual data does not satisfy the one or more conditions, the method 300 can proceed from operation 310 to an operation 314.

The operation 314 can include accessing additional response fulfillment data that is available at a separate computing device, such as a server computing device and/or another client device. The additional response fulfillment data can be pushed to the client computing device and/or provided to the client computing device in response to a request. For example, the client computing device can request the additional response fulfillment data based on determining that the currently available response fulfillment data associated with a particular cache entry is invalid or has otherwise expired. Alternatively, or additionally, the client computing device can request the additional response fulfillment data based on determining that a cache entry is not available for the request from the user, as determined at the operation 304. The method 300 can proceed from operation 314 to an operation 316, which can include causing the automated assistant to perform one or more operations such as providing an assistant output using the additional response fulfillment data.

Figure 4:
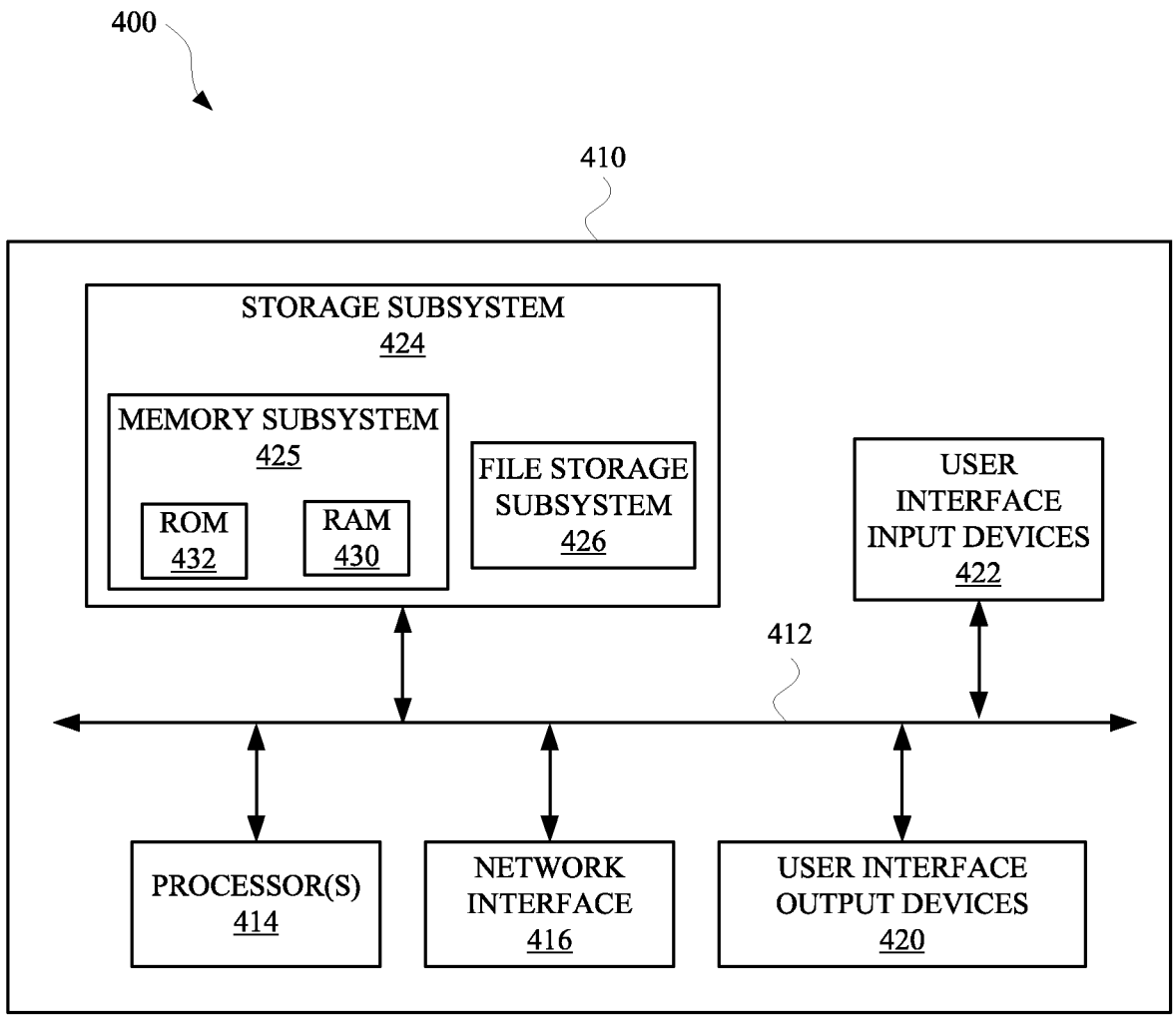
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, home display device 106, client device 132, vehicle 104, and/or any other application, device, apparatus, and/or module discussed herein.

These software modules are generally executed by processor 414 alone or in combination with other processors.

Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a client computing device, a spoken utterance from a user, wherein the spoken utterance is directed to an automated assistant that is accessible via the client computing device. The method can further include an operation of identifying, based on the spoken utterance, a cache entry that includes response fulfillment data corresponding to a request embodied in the spoken utterance, wherein the cache entry is provided in an assistant response cache that is stored at the client computing device. The method can further include an operation of determining, based on the cache entry, whether contextual data associated with the request satisfies one or more conditions that are associated with the cache entry, wherein the one or more conditions indicate a validity of the cache entry. The method can further include an operation of, when the contextual data satisfies the one or more conditions: causing the automated assistant to provide an assistant output that is based on the response fulfillment data stored with the cache entry. The method can further include an operation of, when the contextual data does not satisfy the one or more conditions: providing a separate request to a server computing device in furtherance of retrieving additional response fulfillment data that satisfies the one or more conditions, and causing the automated assistant to provide a separate assistant output that is based on the additional response fulfillment data.

In some implementations, wherein identifying the cache entry corresponding to the request includes: determining that an identifier stored in association with the cache entry identifies the user that the provided the spoken utterance, wherein the response fulfillment data characterizes content that is available to the automated assistant prior to the user providing the request. In some implementations, determining whether contextual data associated with the request satisfies the one or more conditions that are associated with the cache entry includes: determining whether the contextual data identifies a client computing device location that is within a threshold distance of a particular location identified by a particular condition of the one or more conditions, wherein the particular condition is satisfied when the client computing device location is within the threshold distance of the particular location, and wherein the response fulfillment data characterizes a feature of the particular location. In some implementations, the additional response fulfillment data characterizes another feature of a different location that is not within the threshold distance of the particular location.

In some implementations, the wherein the cache entry includes intent data that is available to the automated assistant prior to the user providing the spoken utterance, and wherein the intent data identifies an intent that, when executed by the automated assistant, causes the automated assistant to provide the assistant output or the separate assistant output. In some implementations, wherein the one or more conditions include a particular status of an application operation being performed by an application that is separate from the automated assistant, and wherein the one or more conditions are satisfied when the application operation is exhibiting the particular status. In some implementations, the method can further include an operation of, prior to receiving the spoken utterance from the user: receiving cache entry data from the server computing device associated with the automated assistant, wherein the cache entry data includes the response fulfillment data and condition data that characterizes the one or more conditions associated with the cache entry, and wherein the server computing device provides instances of the cache entry data to multiple different client computing device associated with multiple different users associated with a common context.

In other implementations, a method implemented by one or more processors is set forth as including operations such as processing, at a client computing device, contextual data that characterizes one or more features of a context in which the client computing device is operating, wherein the client computing device provides access to an automated assistant that is responsive to natural language input from a user. The method can further include an operation of determining, based on the contextual data, whether one or more conditions associated with an assistant response cache entry are satisfied, wherein the assistant response cache entry is stored at the client computing device and includes response fulfillment data that is considered valid for fulfilling a particular assistant input when the one or more conditions are satisfied. The method can further include an operation of, when the one or more conditions are determined to not be satisfied based on the contextual data: providing, to a server computing device, a request for additional response fulfillment data, and receiving, based on the request, the additional response fulfillment data from the server computing device. The method can further include an operation of determining, subsequent to receiving the additional response fulfillment data, that the user provided an assistant input that corresponds to the assistant response cache entry. The method can further include an operation of generating, based on the assistant input, an assistant response that is based on the additional response fulfillment data.

In some implementations, determining whether the one or more conditions associated with the assistant response cache entry are satisfied includes: determining whether a current location of the client computing device corresponds to a location identified by the one or more conditions, wherein the one or more conditions are determined to not be satisfied when the current location of the client computing device is not within a threshold distance of the location identified by the one or more conditions. In some implementations, determining whether the one or more conditions associated with the assistant response cache entry are satisfied includes: determining whether the contextual data identifies an operating status of an application that is separate from the automated assistant, and determining whether the operating status of the application satisfies a particular condition of the one or more conditions, wherein the response fulfillment data is based on the operating status of the application.

In some implementations, the method can further include an operation of, prior to processing the contextual data: receiving cache entry data from the server computing device associated with the automated assistant, wherein the cache entry data includes the response fulfillment data and condition data that characterizes the one or more conditions associated with the assistant response cache entry, and wherein the server computing device provides instances of the cache entry data to multiple different client computing devices associated with multiple different users associated with a common context. In some implementations, the assistant response cache entry identifies natural language content that characterizes one or more assistant commands that, when provided by the user to the automated assistant, cause the automated assistant to perform one or more operations corresponding to the particular assistant input. In some implementations, wherein the assistant input is a spoken utterance from the user, and wherein determining that the user provided an assistant input that corresponds to the assistant response cache entry includes: determining that a textual representation of the spoken utterance exhibits a threshold similarity to at least one command of the one or more assistant commands characterized by the natural language content. In some implementations, the assistant response cache entry identifies one or more operation intents that can be initialized by the automated assistant in response to the user providing the particular assistant input to the automated assistant. In some implementations, the assistant input is a spoken utterance from the user, and wherein determining that the user provided an assistant input that corresponds to the assistant response cache entry includes: determining that a natural language understanding (NLU) of the spoken utterance corresponds to the one or more operation intents.

In yet other implementations, a method implemented by one or more processors is set forth as including operations such as receiving, at a server computing device and from a client computing device, a request for response fulfillment data, wherein the request is provided by the client computing device in furtherance of retrieving data that can be utilized by an automated assistant that is executing at client computing device. The method can further include an operation of determining, based on the request, whether the request corresponds to an intent that can be stored in an assistant response cache of the client computing device, wherein the automated assistant accesses the assistant response cache to fulfill one or more particular requests from a user without the automated assistant requesting additional fulfillment data from the server computing device. In some implementations, the method can further include an operation of, when the request corresponds to the intent that can be stored in the assistant response cache: generating, based on the assistant response cache, client response fulfillment data that can be accessed by the automated assistant to fulfill the intent at the client computing device. The method can further include an operation of generating, based on the intent, condition data that characterizes one or more non-temporal conditions in which the client response fulfillment data for the intent is invalid. The method can further include an operation of providing, to the client computing device, the client response fulfillment data and the condition data, wherein, when the client computing device determines that the one or more non-temporal conditions are satisfied, the automated assistant accesses the client response fulfillment data at the client computing device to provide a response to an input from the user.

In some implementations, generating the client response fulfillment data includes: identifying one or more natural language command phrases that, when provided by the user to the automated assistant, the automated assistant to initialize execution of the intent. In some implementations, generating the condition data includes: accessing historical interaction data that is based on one or more prior interactions between the user and the automated assistant, wherein the one or more non-temporal conditions are based on one or more features of a prior context of the one or more prior interactions in which the user caused the automated assistant to execute the intent. In some implementations, determining whether the request corresponds to the intent that can be stored in the assistant response cache of the client computing device includes: determining whether certain response fulfillment data for fulfilling the intent is expected to be modified within a threshold duration of time of receiving the request. In some implementations, determining whether the request corresponds to the intent that can be stored in the assistant response cache of the client computing device includes: determining whether certain response fulfillment data for fulfilling the intent is expected to be accessed within a threshold duration of time of receiving the request.

We claim:

1. A method implemented by one or more processors, the method comprising:
   receiving, at a client computing device, a spoken utterance from a user,
      wherein the spoken utterance is directed to an automated assistant that is accessible via the client computing device;
   identifying, based on the spoken utterance, a cache entry that includes response fulfillment data corresponding to a request embodied in the spoken utterance,
      wherein the cache entry is provided in an assistant response cache that is stored at the client computing device;
   determining, based on the cache entry, whether contextual data associated with the request satisfies one or more conditions that are associated with the cache entry,
      wherein the one or more conditions indicate a validity of the cache entry;
   in response to determining that the contextual data satisfies the one or more conditions:
      causing the automated assistant to provide an assistant output that is based on the response fulfillment data included in the cache entry; and
   in response to determining that the contextual data does not satisfy the one or more conditions:
      providing a separate request to a server computing device in furtherance of retrieving additional response fulfillment data that satisfies the one or more conditions, and
      causing the automated assistant to provide a separate assistant output that is based on the additional response fulfillment data.

2. The method of claim 1, wherein identifying the cache entry that includes the response fulfillment data corresponding to the request embodied in the spoken utterance includes:
   determining that an identifier stored in association with the cache entry identifies the user that the provided the spoken utterance,
      wherein the response fulfillment data characterizes content that is available to the automated assistant prior to the user providing the request.

3. The method of claim 1, wherein determining whether contextual data associated with the request satisfies the one or more conditions that are associated with the cache entry includes:
   determining whether the contextual data identifies a client computing device location that is within a threshold distance of a particular location identified by a particular condition of the one or more conditions,
      wherein the particular condition is satisfied when the client computing device location is within the threshold distance of the particular location, and
      wherein the response fulfillment data characterizes a feature of the particular location.

4. The method of claim 3, wherein the additional response fulfillment data characterizes another feature of a different location that is not within the threshold distance of the particular location.

5. The method of claim 4,
wherein the cache entry includes intent data that is available to the automated assistant prior to the user providing the spoken utterance, and
wherein the intent data identifies an intent that, when executed by the automated assistant, causes the automated assistant to provide the assistant output or the separate assistant output.

6. The method of claim 1,
wherein the one or more conditions include a particular status of an application operation being performed by an application that is separate from the automated assistant, and
wherein the one or more conditions are satisfied when the application operation is exhibiting the particular status.

7. The method of claim 1, further comprising:
prior to receiving the spoken utterance from the user:
receiving cache entry data from the server computing device,
wherein the cache entry data includes the response fulfillment data and condition data that characterizes the one or more conditions that are associated with the cache entry, and
wherein the server computing device provides instances of the cache entry data to multiple different client computing device associated with multiple different users associated with a common context.

8. A method implemented by one or more processors, the method comprising:
processing, at a client computing device, contextual data that characterizes one or more features of a context in which the client computing device is operating,
wherein the client computing device provides access to an automated assistant that is responsive to natural language input from a user;
determining, based on the contextual data, whether one or more conditions associated with an assistant response cache entry are satisfied,
wherein the assistant response cache entry is stored at the client computing device and includes response fulfillment data that is considered valid for fulfilling a particular assistant input when the one or more conditions are satisfied;
in response to determining, based on the contextual data, that the one or more conditions are not satisfied:
providing, to a server computing device, a request for additional response fulfillment data, and
receiving, based on the request, the additional response fulfillment data from the server computing device;
determining, subsequent to receiving the additional response fulfillment data, that the user provided an assistant input that corresponds to the assistant response cache entry; and
generating, based on the assistant input, an assistant response that is based on the additional response fulfillment data.

9. The method of claim 8, wherein determining whether the one or more conditions associated with the assistant response cache entry are satisfied includes:
determining whether a current location of the client computing device corresponds to a location identified by the one or more conditions,
wherein the one or more conditions are determined to not be satisfied when the current location of the client computing device is not within a threshold distance of the location identified by the one or more conditions.

10. The method of claim 8, wherein determining whether the one or more conditions associated with the assistant response cache entry are satisfied includes:
determining whether the contextual data identifies an operating status of an application that is separate from the automated assistant, and
determining whether the operating status of the application satisfies a particular condition of the one or more conditions,
wherein the response fulfillment data is based on the operating status of the application.

11. The method of claim 8, further comprising:
prior to processing the contextual data:
receiving cache entry data from the server computing device
wherein the cache entry data includes the response fulfillment data and condition data that characterizes the one or more conditions that are associated with the assistant response cache entry, and
wherein the server computing device provides instances of the cache entry data to multiple different client computing devices associated with multiple different users associated with a common context.

12. The method of claim 8, wherein the assistant response cache entry identifies natural language content that characterizes one or more assistant commands that, when provided by the user to the automated assistant, cause the automated assistant to perform one or more operations corresponding to the particular assistant input.

13. The method of claim 12,
wherein the assistant input is a spoken utterance from the user, and
wherein determining that the user provided an assistant input that corresponds to the assistant response cache entry includes:
determining that a textual representation of the spoken utterance exhibits a threshold similarity to at least one command of the one or more assistant commands characterized by the natural language content.

14. The method of claim 8, wherein the assistant response cache entry identifies one or more operation intents that can be initialized by the automated assistant in response to the user providing the particular assistant input to the automated assistant.

15. The method of claim 14,
wherein the assistant input is a spoken utterance from the user, and
wherein determining that the user provided an assistant input that corresponds to the assistant response cache entry includes:
determining that a natural language understanding (NLU) of the spoken utterance corresponds to the one or more operation intents.

16. A method implemented by one or more processors, the method comprising:
receiving, at a server computing device and from a client computing device, a request for response fulfillment data, wherein the request is provided by the client computing device in furtherance of retrieving data that can be utilized by an automated assistant that is executing at the client computing device;

determining, based on the request, whether the request corresponds to an intent that can be stored in an assistant response cache of the client computing device, wherein the automated assistant accesses the assistant response cache to fulfill one or more particular requests from a user without the automated assistant requesting additional fulfillment data from the server computing device; and in response to determining that the request corresponds to the intent that can be stored in the assistant response cache:

generating, based on the assistant response cache, client response fulfillment data that can be accessed by the automated assistant to fulfill the intent at the client computing device, generating, based on the intent, condition data that characterizes one or more non-temporal conditions in which the client response fulfillment data for the intent is invalid, and providing, to the client computing device, the client response fulfillment data and the condition data, wherein, when the client computing device determines that the one or more non-temporal conditions are satisfied, the automated assistant accesses the client response fulfillment data at the client computing device to provide a response to an input from the user.

17. The method of claim 16, wherein generating the client response fulfillment data includes:

identifying one or more natural language command phrases that, when provided by the user to the automated assistant, causes the automated assistant to initialize execution of the intent.

18. The method of claim 16, wherein generating the condition data includes:

accessing historical interaction data that is based on one or more prior interactions between the user and the automated assistant, wherein the one or more non-temporal conditions are based on one or more features of a prior context of the one or more prior interactions in which the user caused the automated assistant to execute the intent.

19. The method of claim 16, wherein determining whether the request corresponds to the intent that can be stored in the assistant response cache of the client computing device includes:

determining whether certain response fulfillment data for fulfilling the intent is expected to be modified within a threshold duration of time of receiving the request.

20. The method of claim 16, wherein determining whether the request corresponds to the intent that can be stored in the assistant response cache of the client computing device includes:

determining whether certain response fulfillment data for fulfilling the intent is expected to be accessed within a threshold duration of time of receiving the request.

* * * * *